United States Patent [19]

Gee et al.

[11] Patent Number: 5,228,349
[45] Date of Patent: Jul. 20, 1993

[54] COMPOSITE POWER SHAFT WITH INTRINSIC PARAMETER MEASURABILITY

[75] Inventors: Herbert F. Gee; James R. Parkinson, both of Vergennes, Vt.

[73] Assignee: Simmonds Precision Products, Inc., Akron, Ohio

[21] Appl. No.: 584,173

[22] Filed: Sep. 18, 1990

[51] Int. Cl.$^5$ .............................................. G01L 3/10
[52] U.S. Cl. .................. 73/862.336; 324/207.72; 324/207.25
[58] Field of Search .......... 73/862.32, 862.33, 862.34, 73/650; 324/207.22, 207.25, 173

[56] References Cited

U.S. PATENT DOCUMENTS

| | | | |
|---|---|---|---|
| 2,564,484 | 8/1951 | Kuehni | 73/862.33 |
| 3,069,902 | 12/1962 | Crosby | 73/862.32 |
| 3,548,649 | 12/1970 | Parkinson | 73/862.33 |
| 4,083,518 | 4/1978 | Garrison et al. | 73/862.34 X |
| 4,089,190 | 5/1978 | Worgan et al. | 64/1 S |
| 4,214,440 | 7/1980 | Rucker | 60/226 B |
| 4,590,806 | 5/1986 | Lutton et al. | 73/862.34 |
| 4,666,753 | 5/1987 | Matuska et al. | 428/137 |
| 4,695,341 | 9/1987 | Matuska et al. | 156/161 |
| 4,899,596 | 2/1990 | Janik et al. | 73/862.33 |
| 4,972,725 | 11/1990 | Choisnet | 73/862.33 |

*Primary Examiner*—Donald O. Woodiel
*Attorney, Agent, or Firm*—William E. Zitelli; Leonard L. Lewis

[57] ABSTRACT

A composite torque transmitting power shaft is provided with built-in discrete sensible ferromagnetic elements. The composite shaft is formed of a non-ferromagnetic material so that the sensible elements, disposed interiorly of the shaft, can be sensed by a sensor element positioned outside of the shaft. Two groups of sensible elements are movable with respect to each other as the shaft twists under the application of torque. The elements can be sensed to provide an indication of the speed, torque or horsepower transmitted by the shaft. Further, the frequency and amplitude of torsional oscillations caused by pulsating power source or load characteristics can also be measured.

38 Claims, 1 Drawing Sheet

COMPOSITE POWER SHAFT WITH INTRINSIC PARAMETER MEASURABILITY

BACKGROUND OF THE INVENTION

1. Technical Field of the Invention

The present invention relates to the field of torque transmitting members, such as power shafts, having inherent or intrinsic parameter measurability. The present invention also relates to a method of fabricating such torque transmitting power shaft members having inherent parameter measurability. In particular, the parameters that are measurable by virtue of the inherent structural nature of the power shaft of the invention include the torque applied to the shaft which is directly related to the twist of the shaft, the speed of shaft rotation, as well as both the frequency and amplitude of the torsional oscillations excited by pulsating source and shaft load characteristics. Moreover, having measured the torque and speed of the shaft, the horsepower can readily be obtained.

2. Description of Background of Invention

In virtually every industrial application conceivable, and particularly in the field of aircraft propulsion, rotating shafts are used to transmit and apply torque. It is frequently desirable, in the broad range of such applications, to be able to perform an accurate and efficient measurement of the torque applied to a rotating shaft. Such a torque measurement can be used to control or monitor the operation of the system within which the rotating shaft is utilized.

Similarly, it is often desirable to be able to provide an accurate and efficient measurement of the speed at which a shaft is rotating. Such speed measurement can also be used to control and monitor the operation of the various components of the system within which the rotating shaft is employed.

Further, it is frequently both necessary and desirable to be capable of measuring the horsepower transmitted by a driven shaft. Further, in many situations, a measurement of not only the average transmitted torque, but also the frequency and amplitude, of the torsional oscillation components that comprise the average torque, are also necessary.

The purpose of such control and monitoring can be quite varied. Such measurements can be used to avoid or warn of the approach of the monitored or controlled member to its design limits. Thus, catastrophic failure of the member under excessive torque or at high speeds can be avoided. Overstressing of the member, which can occur by applying excessive torque thereto, can also jeopardize the useful lifetime of the member by accelerating the fatigue failure of the member. For all of the above reasons and many others, it has long been known that accurate and efficient torque and speed measurements are desirable in a wide variety of applications.

In the prior art, numerous examples of torque and speed measuring devices are known and have been applied to rotating shafts of all sorts and within all types of environments. These prior art torque and speed measuring devices utilize various known physical principles for measuring the speed and torque of the shaft member.

Torque and speed measuring devices that utilize either variable reluctance sensors or optical Faraday rotators are known. To use such known sensors, a rotating shaft generally includes two toothed members which define discrete sensible discontinuities about the rotating shaft. These two members are positioned adjacent to each other and are mounted and affixed to the shaft at locations spaced a predetermined distance apart from each other. Thus, shaft rotation and shaft twisting under the application of a torque load results in the generation of a pulse string by the sequential movement of the sensible discontinuities past an appropriately positioned and appropriately configured sensor.

In a preferred embodiment, toothed members that define the discrete, sensible discontinuities comprise first and second gears or gear-like members. The gears are each provided with the same number of teeth and are configured such that the teeth of one gear are positioned between the teeth of the other gear. The sensing element, which, in the preferred embodiment comprises a single pole sensor, is positioned externally of the torque transmitting shaft at the interface between the adjacent gears, and in direct proximity to the intermeshed gear teeth. The sensor is arranged to detect the spacing between teeth as the spacing varies with applied torque.

The sensor, which can either be a variable reluctance, an optical/Faraday rotator, or can utilize any other sensing technology capable of magnetically discerning the relative positions of the intermeshed teeth as they pass by the sensor during shaft rotation, detects the magnetic center of each tooth as it passes the sensor location and consequently produces an output pulse train in which the phase relationship of adjacent pulses represents the relative rotational positions of the adjacently positioned gear-like members located within the composite shaft. The relative rotational positions of the gear-like members are dictated by the amount of torsional deflection in the composite power shaft, and thus provide a signal directly related to the transmitted shaft torque. The gear-produced signal can also be utilized to sense the operating temperature of the rotating shaft. This can be utilized to compensate for variation in the shaft twist due to temperature and results in the very accurate torque measurements required in many applications.

With respect to speed, the same gear-like elements carrying the discrete discontinuities can be sensed in any similar, conventional manner to yield a resultant signal which will be an accurate measure of the rotary speed of the shaft. As the sensing device in either of the above two environments, a single pole magnetic sensor, or a single pole fiber optic sensor is conventionally utilized.

In certain modern day applications, metal torque transmitting members are being replaced more and more by high strength shafts formed of composite materials. This move towards the use of non-metallic composite materials is particularly prevalent in the aircraft industry where both high strength and low weight are prime considerations. Many of these composite materials comprise fiber reinforced resin matrix compositions. The composites from which these drive members can be fabricated include, but are not limited to, boron and/or carbon fibers embedded in a solid resin matrix.

In accordance with the aims and needs outlined above, often, torque transmitting shafts and other members in these various diverse environments are provided with sensing portions attached thereto to be sensed by adjacently positioned sensors to yield a measurement of the torque to which the shaft is subjected. One serious problem with such prior art torque measuring mechanisms is that the shaft must be provided with a through hole or other aperture to enable the sensor positioned externally of the shaft to sense the rotation of sensing portions attached to the shaft. This rotation is related to the twist of the shaft and, thus, to the torque applied to the shaft and is the sensed parameter in many of the prior art torque and speed sensing and measuring devices.

However, providing an aperture in the torque transmitting shaft poses several significant problems. Firstly, it provides a severe weakening in the load bearing and torque transmitting capability of the shaft, thus decreasing the usefulness of the shaft, particularly in the high torque applications which very often are required in many environments. Secondly, such through holes often produce unpredictable stress concentrations which are very undesirable in these environments. Because of the extremes of temperature at which many torque transmitting shafts and other members are often utilized, such unpredictable stress concentrations and non-uniformity in the thermal reactions (i.e., expansion) must be avoided. Further, the provision of through holes allows dust and other contaminants to enter the shaft. Through holes or arrangements where the gear teeth are mounted exteriorly of the shaft also allow the teeth to become chipped or otherwise damaged. A chipped tooth can result in a distorted signal output and is thus to be avoided. Further, by having the reference sleeve entirely within the shaft, the entire shaft exterior surface remains visible. This facilitates visual inspection of the shaft surface, such as for fatigue cracks and similar defects.

Moreover, as discussed above, the use of composite materials to fabricate a torque transmitting shaft, would also provide a very significant reduction in shaft weight. Besides being desirable in and of itself, such weight reduction in many applications is operative to raise the critical speed of the shaft above the level of design concern.

Thus, there has been a very long felt, and significant need in the field for torque transmitting members having the capability of providing a sensing element to be sensed by an appropriate torque measurement sensor device which is free from the above-discussed deficiencies. In particular, it would be advantageous if such a sensing mechanism could be provided that did not require deforming or providing apertures or holes in the structure of the shaft itself. It is this need in the art that the present invention is designed to solve and, in fact, does solve in a very efficient and cost effective manner.

It is therefore among the objects of the present application to provide a torque transmitting member, such as a shaft, not suffering from the above-described deficiencies. In particular, it is an object of the present application to provide a torque transmitting shaft that provides a sensing element, sensible from outside the shaft, without requiring the provision of apertures in the wall of the shaft. It is a further object of the present invention to provide a method of forming such a shaft and for sensing the relative movement between interiorly disposed reference members secured to such a shaft, whose relative locations vary in accord with the transmitted shaft torque. Such a shaft, in addition to being capable of generating signals related to the torque transmitted by the shaft, can also be utilized to indicate the speed of the shaft, its transmitted horsepower, as well as the frequency and amplitude of torsional oscillations caused by pulsating load and source characteristics.

SUMMARY OF THE INVENTION

The composite shaft of the present invention is formed of a tubular power shaft fitted with an internal torque indicating gear-like structure and a reference gear-like structure which is mounted to an internally disposed sleeve assembly, thus providing an intermeshed set of discrete sensible structures similar to gear teeth at one axial location within the composite tubular power shaft. Only the discrete sensible structure (gear teeth) and the immediate structure near these structures need to be fabricated from a ferromagnetic material. All other portions of the assembly, including the tubular power shaft and the internal sleeve assembly, can be made from conventional composite materials. This construction will both minimize weight and optimize bonding of the internal assembly to the inside wall of the power shaft. Such construction will enable the magnetic portions disposed within the tubular power shaft to be sensed through the material of the power shaft itself without requiring any through holes to be provided in the shaft walls. The sensors that can be provided adjacent to and external of the power shaft include, but are not limited to, a variable reluctance sensor or an optical Faraday rotator. Thus, the magnetic sensing by the external sensor, of the two adjacent portions of the discrete structures, would not be adversely affected by the presence of the composite shaft material between the sensor and the sensible structure due to the non-magnetic characteristics of the composite material.

The invention includes a composite shaft comprising a member for transmitting torque and comprising a first non-ferromagnetic material, a member for providing a twist measurement reference and comprising a second non-ferromagnetic material as well as structure for generating a sensor signal and comprising a ferromagnetic material secured for a movement with the transmitting member and with the reference providing member.

The composite shaft according to the invention is further defined by the member for transmitting torque being a tubular shaft and wherein the first non-ferromagnetic material comprises a composite material. The composite shaft according to the present invention is further defined by the member for providing a reference being an elongated member and wherein the second non-ferromagnetic material comprises a composite material. The composite shaft according to a feature of the present invention includes the member for providing the reference being an elongated member received within the tubular shaft and wherein the non-ferromagnetic material comprises a composite material.

As a feature of the invention, both the first and second non-ferromagnetic materials are substantially identical and the ferromagnetic material includes a plurality of ferromagnetic elements that are located internally of the tubular shaft. The elements also include securing of the elements to each of the elongated member and the tubular shaft.

As a further feature, according to the present invention the member for transmitting torque and the member for providing the reference are secured together for rotation. Further, the ferromagnetic material comprises repeating patterns defined by the ferromagnetic material and the repeating patterns define a relationship that varies in accord with the transmitted torque.

The torque transmitting shaft according to a further feature of the invention comprises an axially extending torque transmitting member comprising a first non-ferromagnetic material, an axially extending sleeve member comprising a second non-ferromagnetic material and means securing the sleeve member within the interior of the torque transmitting member, a first ferromagnetic element mounted for movement together with the sleeve, and a second ferromagnetic element mounted for movement together with the torque transmitting member and intermeshed with the first ferromagnetic element.

As a further feature of the invention, the first and second ferromagnetic elements comprise means for activating a sensor element through the non-ferromagnetic material of the torque transmitting member. Moreover, the first and second non-ferromagnetic materials comprise composite materials. According to a further feature of the invention, the first and second non-ferromagnetic materials comprise substantially identical materials and the first and second ferromagnetic elements comprise repeating formations.

According to the invention, the repeating formations of the first and second ferromagnetic elements define a relationship that varies in accord with the torque transmitted by the shaft. The repeating formations of the first and second ferromagnetic elements comprise intermeshing teeth. Further, the first and second ferromagnetic elements comprise means cooperating with a sensor element for generating an output representative of torque applied to the shaft.

As a further feature of the present invention, the first and second ferromagnetic elements comprise elements adapted to undergo relative movement with respect to each other and in response to twist of the shaft. According to one feature of the present invention, the sensor element can measure the speed of the shaft, while according to another feature the sensor element can measure the torque applied to the shaft. Further, from the speed and torque, a measure of the horsepower transmitted by the shaft can be readily obtained.

The invention is also defined by a method of forming a torque transmitting element having intrinsic parameter measurability. The method comprises forming a torque transmitting member of a non-ferromagnetic material, forming a reference member of a non-magnetic material; providing at least one ferromagnetic element at a defined location on each of the torque transmitting member and the reference member, and positioning the torque transmitting member and the reference member so that the ferromagnetic elements of the members are adjacently positioned.

The method of forming a torque transmitting element according to the invention, includes forming the members of composite material. The step of positioning according to the present invention comprises positioning the ferromagnetic elements in intermeshed relation to each other. Further, according to the present invention, the ferromagnetic elements can be sensed through the non-ferromagnetic material of the torque transmitting member.

A further feature of the invention includes providing a plurality of ferromagnetic elements on each of the members and positioning the plurality of ferromagnetic elements of the members to form a relationship that varies in a predictable fashion in accord with the transmitted torque. According to the invention, the step of providing at least one ferromagnetic element comprises forming each ferromagnetic element as a gear having spaced teeth. Thus, the step of positioning comprises locating the teeth of the members in an intermeshing relationship.

As a further feature, the forming method of the present invention includes the step of forming a torque transmitting member which comprises forming a tubular shaft, and the step of positioning comprises positioning the reference member within the torque transmitting member. Moreover, according to a further feature of the invention, each of the steps of forming comprises forming the members of substantially identical composite materials.

The present invention also includes a method of sensing relative movement between the intermeshed teeth of the internally disposed members. Such method includes disposing a sensor adjacent to the shaft and to the member and sensing, by utilizing the sensor, relative movement between the teeth attached to the shaft and the teeth attached to the sleeve through the material of the shaft. This method further includes utilizing, for the shaft and member, materials permeable to the medium utilized by the sensor. According to a further feature, the invention utilizes a composite material having sensible formations (i.e., teeth) positioned adjacent the sensor. The present method of sensing further includes forming the sensible formations of a ferromagnetic material.

Further, the present invention involves a method of sensing relative circumferential movement between axially spaced portions of a shaft (i.e., twist), by providing discrete sensible structures (teeth) for movement with the shaft and with a sleeve attached to the shaft. The sleeve is attached to the shaft at a position spaced from the teeth of the shaft. The teeth of the shaft and of the sleeve attached thereto are, however, positioned adjacent to each other to enable the relationship between the teeth, and the variation therein, in accord with the torque transmitted by the shaft, to be measured by a sensor. Thus, the invention also involves generating a sensor signal by means of the sensible structures. The method further includes generating a sensor signal by sensing, from outside of the shaft, the relative movement of the sensible structures (i.e., teeth), and forming the sensible structures as ferromagnetic elements.

BRIEF DESCRIPTION OF THE DRAWINGS

The invention is further explained in the detailed description which follows, with reference to the drawings, by way of non-limiting examples of the preferred embodiment of the invention, in which like reference numerals represent similar parts throughout the several views; and wherein.

DESCRIPTION OF THE PREFERRED EMBODIMENT

Figure 1:
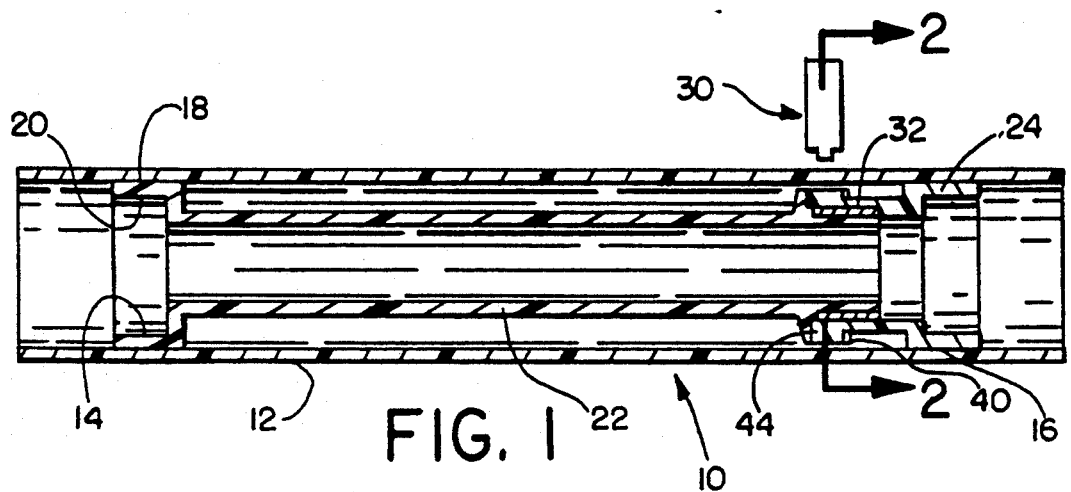
FIG. 1 is a side elevational view, in longitudinal cross section, of the composite power shaft of the present invention.

With detailed reference to the drawings, and particularly with reference to FIG. 1, there is illustrated in schematic, longitudinal cross-sectional fashion, the composite torque transmitting member or shaft of the present invention. As shown therein, the composite torque transmitting shaft 10 of the present invention is composed of an outer, composite material formed as a generally tubular, axially extending torque transmitting power shaft member 12, and an interiorly disposed, reference sleeve 14 formed of a non-ferromagnetic material. The reference sleeve 14 includes a first section 22, having a first cross-sectional area and axially extending for a predetermined length, and a second section 20, which has a cross-sectional dimension (e.g., diameter, if the cross section is circular), somewhat larger than the cross-sectional dimension of the axially extending portion 22. The inner cross-sectional dimension of the composite power shaft 12 and the outer cross-sectional dimension of the composite reference sleeve 14 are selected to be substantially the same. In other words, the outer dimension of the portion 20 is substantially the same as the inner dimension of the composite power shaft 12. In any conventional manner, the composite reference sleeve 14 is bonded to the composite power shaft 12 at the interface 18 between the portion 20 of the composite reference sleeve and a portion of the interior surface of the composite power shaft 12. The nature and means utilized to form the bond is not of any great significance to the present invention. However, the bond should be permanent and strong enough to ensure that there is no movement between the reference sleeve and the composite power shaft at the position where they are bonded to each other.

Spaced a predetermined distance from the portion 20 of the composite reference sleeve 14, and interiorly of the composite power shaft 12, a composite torque ring 24 is provided. The composite torque ring is provided with a permanent bond 16 for securing the external surface of the torque ring to the internal surface of the power shaft at a predetermined location along the axial extent of the power shaft. The positioning of the composite reference sleeve and the composite torque ring is such that the free ends of each (i.e., the ends opposite the previously discussed ends that are permanently bonded to the internal surface of the composite power shaft) are positioned to be adjacent to the sensor 30, which is located externally of the power shaft 12.

The structure of the free ends of the composite torque ring and composite reference sleeve form a gear-like toothed intermeshing structure. In other words, the free ends of each of the torque ring and reference sleeve are formed with discrete intermeshed gear tooth-like formations 40, 44 so as to enable the discrete formations to be sensed by an appropriately positioned and structured sensor. A variable reluctance sensor or Faraday rotator sensor could be used in conjunction with the composite power shaft of the present invention. A reference sleeve bearing 32 is shown to be mounted between the composite reference sleeve and the composite torque ring so as to provide an appropriate bearing surface for the relative rotation of these elements.

The intermeshed torque and reference gear-like structures 40 and 44, as shown in FIG. 1, are each formed of a ferromagnetic material, while the remainder of the composite power shaft is formed of a composite material of a non-ferromagnetic type. Those skilled in the art are well aware of a wide range of different types of composite materials that can be used in the fabrication and manufacture of torque transmitting shafts of low weight and high strength which are conventionally used in the aircraft industry. The particular composition of the composite material, other than what is described herein, is not a critical feature of the present invention and, accordingly, no further details of the composite material are given. However, it Will be apparent to one of routine expertise in the technology that any composite non-ferromagnetic material can be used as long as it has the requisite strength and weight characteristics.

A pertinent feature of the present invention relates to the material utilized to form the intermeshed torque and reference gear-like sensible structures (i.e., gear teeth). According to the teachings of the present invention, these teeth, and the material directly surrounding them, are formed of a ferromagnetic material. Thus, the magnetic sensing of gear tooth positions by the appropriately located sensor 30 is not adversely affected by the presence of the composite shaft material between the sensor and the ferromagnetic gear tooth portions due to the non-ferromagnetic characteristics of the composite power shaft 12. Thus, the composite shaft can be fabricated without requiring the provision of any holes therethrough which would produce, as noted above, unpredictable stress concentrations, as well as admit dirt and other contaminants into the interior of the shaft as well as to permit the teeth to become damaged.

Because, according to a preferred embodiment of the present invention, each of the composite power shaft 12, the composite reference sleeve 14, and the composite torque ring 24 are formed of a composite material, and preferably the composite material utilized for each one of these three components will be selected so as to be substantially identical, problems in the bonding of the internal assembly (i.e., reference sleeve and torque ring) to the inside wall of the power shaft will be minimized. Forming each of these components of a substantially identical composite material, in addition to simplifying the bonding of these components to each other, also reduces the weight of the entire composite torque transmitting structure, which is quite beneficial. Additionally, utilizing substantially similar materials for each of these components results in a minimization of the thermal expansion problems inherent in bonding diverse materials to each other. This will further aid in eliminating local areas of high stress concentration at the extremes of the temperature range within which the composite shaft is utilized.

Figure 2:
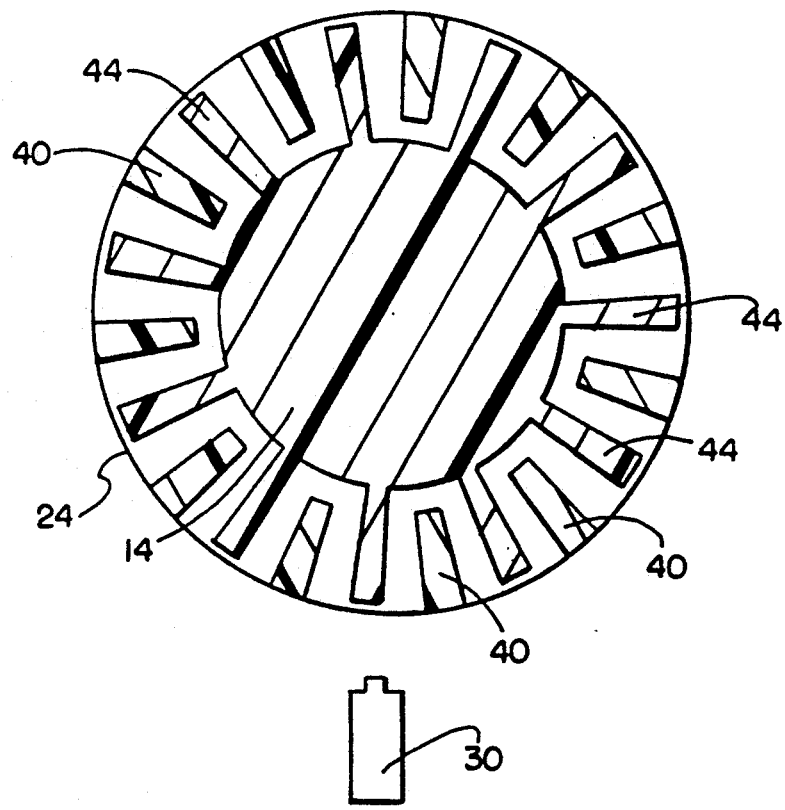
FIG. 2 is a transverse cross-sectional view of the composite power shaft of the present invention taken along the line I—I of FIG. 1.

Having thus described the structure, fabrication and assembly of the composite power shaft, the manner of its operation and cooperation with the externally disposed sensor 30 will now be described. As discussed above, the free ends of each of the composite reference sleeve 14 and torque ring 24 are provided with gear tooth-like structures or formations 40, 44 thereon. These teeth-like formations are positioned in intermeshing relationship to each other (FIG. 2). Since these discrete teeth-like structures are formed of a ferromagnetic material and the remainder of the shaft is formed of a non-ferromagnetic material, an appropriately positioned sensor 30 disposed outside of the shaft can sense the passing of the individual teeth concurrent with the rotation of the shaft, and can generate, in a conventional manner, an output signal pulse train representative of the passing of the teeth in a sequential manner. Because the teeth disposed at the free end of the composite reference sleeve are secured to the composite power shaft at a position 18 spaced substantially from the free end of the composite reference sleeve, as torque is applied to the shaft and as, in response to the application of torque thereto, the shaft undergoes twisting motion along its length, there will be a shifting of the teeth at the free end of the composite reference sleeve with respect to the teeth provided at the free end of the composite torque ring. Thus, the spacing between the intermeshed teeth attached to the shaft and sleeve will vary. This variation will be sensed by the sensor 30, which will generate a pulse train defined by the spacing between the teeth and the variation therein. The phase relationship between adjacent pulses in the train will correspond to shaft twist, or to the applied shaft torque that causes the twist. The pulses can also be utilized to provide an indication of shaft temperature,* which can be utilized to correct the measured value of the torque, which is known to vary with temperature. Similarly, the speed of the power shaft will be readily ascertainable from the repetition rate of the pulse train generated by the teeth.

*(As disclosed in commonly assigned copending U.S. patent application Ser. No. 07/552,107 filed Jul. 17, 1990)

The means, mechanism and structure for utilizing the output of the sensor 30, as described above, is conventional and would be well within the scope of one of routine skill in the art. Moreover, such circuit means and other structure, including constructional and functional details of various types of sensors that can be utilized herein, are disclosed in U.S. Pat. No. 3,548,649 (PARKINSON), and U.S. Pat. No. 4,590,806 (LUTTON et al.), the disclosures of both of which are expressly incorporated in their entirety herein by reference thereto. Both of these documents utilize the relative displacement between intermeshed gear-like teeth secured to a torque loaded shaft and to a sleeve spaced with respect to the torque loaded shaft to derive a signal representative of the shaft twist, and then relate the twist of the shaft to the torque applied to the shaft.

In particular, the above-mentioned PARKINSON patent discloses a circuit for processing the sensor output signal. A zero cross-over detector is utilized to convert the sensor signal into a train of pulses which is utilized to alternately turn "on" and "off" a bistable multivibrator, thus producing a rectangular wave form whose ratio of "on" and "off" times is directly related to the gear teeth positions.

The composite shaft of the present invention is ideally suited for being utilized together with the sensor circuitry and other processing means, as disclosed in the above-referenced patents. Nevertheless, the composite shaft of the present invention can be used with different types of sensors aside from those disclosed in the above-referenced patents, as well as to provide different types of outputs to be utilized for different purposes, all in accordance with the ordinary teachings in the art.

In particular, the composite shaft of the present invention is also inherently capable of providing a direct measurement of the transmitted shaft horsepower. Since, as set forth above, the external sensor provides a signal containing data related to both the torque and speed of the shaft, the transmitted horsepower can readily be obtained by means of the relationship Horsepower = (Speed X Torque)/K where K is a constant factor. Implementation of appropriate circuitry to provide, as a sensor output, a measure of the transmitted shaft horsepower can readily be performed by one of ordinary skill in the art in view of the discussion set forth above. Thus, the output of the single sensor will contain adequate data to enable direct horsepower measurement.

In addition, no particular limitation is to be implied herein by the use of a particular composite material; rather, the use of any conventional composite material of a non-ferromagnetic nature is contemplated as being within the purview of the invention.

Further, in many torque measurement environments and applications, it is desirable to be able to measure, not only the average transmitted shaft torque, but also the amplitude and frequency of the torsional oscillation components that contribute to the average torque. High torsional oscillations exist in systems driven by fluctuating power sources, such as, e.g., internal combustion engines or in systems that are utilized to drive fluctuating loads, such as, e.g., helicopter main rotor blades.

The number of intermeshed teeth provided about the periphery of the toothed gear-like member is sufficient to obtain multiple torque measurements during each shaft rotation. During the processing of the signal generated by the intermeshed teeth, conventional signal filtering techniques are utilized to provide a D.C. voltage signal. By appropriately selecting the filter level of the signal processing circuitry, selected frequencies can be permitted to pass through the filter. These frequencies are usually specified by the aircraft manufacturer. These selected frequencies provide an output which is directly related to the amplitude and frequency of the torsional oscillation of the power source or load.

While the invention has been described in its preferred embodiments, it is to be understood that the words which have been used herein are words of description, rather than words of limitation. Changes may be made within the purview of the appended claims without departing from the scope and spirit of the invention in its broader aspects. Although the invention has been described herein in reference to particular means materials and embodiments, it is to be understood that the invention is not to be limited to the particulars disclosed herein, and that the invention extends to all equivalents within the scope of the appended claims.

We claim:

1. A composite shaft comprising:
   means for transmitting torque and comprising a first non-ferromagnetic material;
   means for providing a twist measurement reference and comprising a second non-ferromagnetic material; and
   means for activating a sensor signal, said activating means comprising ferromagnetic material positioned interiorly said shaft and secured for movement together with said transmitting means and with said providing means whereby said sensor signal can be activated outside said shaft by said ferromagnetic material through said first non-ferromagnetic material.

2. The composite shaft according to claim 1, wherein said means for providing a reference comprises an elongated member and wherein said second non-ferromagnetic material comprises a composite material.

3. The composite shaft according to claim 1, wherein said means for transmitting comprises a tubular shaft and wherein said first non-ferromagnetic material comprises a composite material.

4. The composite shaft according to claim 3, wherein said means for providing a reference comprises an elongated member received within said tubular shaft and wherein said second non-ferromagnetic material comprises a composite material.

5. The composite shaft according to claim 4, wherein said first and second non-ferromagnetic materials are substantially identical.

6. The composite shaft according to claim 4, wherein said ferromagnetic material comprises a plurality of ferromagnetic elements and means for positioning said elements interiorly of said tubular shaft.

7. The composite shaft according to claim 6, wherein said elements include means for securing said elements to each of said elongated member and said tubular shaft.

8. The composite shaft according to claim 1, wherein said means for transmitting torque and said means for providing a reference are secured together for rotation.

9. The composite shaft according to claim 1, wherein said ferromagnetic material comprises a plurality of ferromagnetic elements defining a plurality of repeating patterns.

10. The composite shaft according to claim 9, wherein said sensor signal activated by said corresponds to at least one of shaft torque, speed, horsepower and torsional oscillations.

11. A composite shaft according to claim 1 in combination with a sensor that produces an output signal in response to movement of said sensible elements.

12. The combination of claim 11 wherein said sensor is outside the shaft and said sensible elements are inside the shaft.

13. A torque transmitting shaft comprising:
a tubular, axially extending torque transmitting member comprising a first non-ferromagnetic material;
an axially extending sleeve comprising a second non-ferromagnetic material, and means for securing said sleeve within the interior of said torque transmitting member;
first ferromagnetic means mounted for movement together with said sleeve; and
second ferromagnetic means mounted for movement together with said torque transmitting member and intermeshed with said first ferromagnetic means wherein said first and second ferromagnetic means comprise means for activating a sensor through the non-ferromagnetic material of said torque transmitting member.

14. The torque transmitting shaft in accordance with claim 13, wherein said first and second non-ferromagnetic materials comprise composite materials.

15. The torque transmitting shaft according to claim 13, wherein said first and second non-ferromagnetic materials comprise substantially identical materials.

16. The torque transmitting shaft according to claim 13, wherein said first and second ferromagnetic means comprise a plurality of repeating formations.

17. The torque transmitting shaft according to claim 16, wherein said repeating formations of said first and second ferromagnetic means comprise intermeshing teeth.

18. The torque transmitting shaft according to claim 17, wherein said first and second ferromagnetic means comprise means for measuring at least one of shaft torque, speed, horsepower and torsional oscillations.

19. The torque transmitting shaft according to claim 13, wherein said first and second ferromagnetic means comprise means cooperating with a sensor element for generating an output representative of torque applied to the shaft.

20. The torque transmitting shaft according to claim 13, wherein said first and second ferromagnetic means are adapted to undergo relative movement with respect to each other in response to twist of the shaft.

21. The torque transmitting shaft according to claim 13, wherein the sensor element measures the speed of said shaft.

22. The torque transmitting shaft according to claim 13, wherein the sensor element measures the torque applied to said shaft.

23. The torque transmitting shaft according to claim 13 wherein said torque transmitting member is intact and said first and second ferromagnetic means are sealingly enclosed within said torque transmitting member.

24. The torque transmitting shaft according to claim 23 further comprising a composite torque member secured within the interior of said torque transmitting member, said second ferromagnetic means being mounted for movement with said composite torque member, said composite torque member and said sleeve sealingly enclosing said first and second ferromagnetic means within said torque transmitting member.

25. A method of forming a torque transmitting element having intrinsic parameter measurability, said method comprising:
forming an intact torque transmitting member of a non-ferromagnetic material;
forming a reference member of a non-magnetic material;
providing at least one ferromagnetic element at a defined location on each of the torque transmitting member and the reference member; and
positioning the torque transmitting member and the reference member so that the ferromagnetic elements of the members are adjacently positioned interiorly the torque transmitting member and can be sensed through the non-ferromagnetic material thereof.

26. The method of forming a torque transmitting element according to claim 25, wherein each of the forming steps comprises forming each of the members of a composite material.

27. The method of forming a torque transmitting element according to claim 25, wherein the positioning step comprises positioning the ferromagnetic elements in intermeshed relation to each other.

28. The method of forming a torque transmitting element according to claim 25, wherein the providing step comprises providing a plurality of ferromagnetic elements on each of the members.

29. The method of forming a torque transmitting element according to claim 28, wherein the positioning step comprises enabling the ferromagnetic elements to be sensed to measure at least one of shaft torque, speed, horsepower and torsional oscillations.

30. The method of forming a torque transmitting element according to claim 25, wherein the step of providing at least one ferromagnetic element comprises forming each ferromagnetic element as a gear-like member having spaced teeth.

31. The method of forming a torque transmitting element according to claim 30, wherein the step of positioning comprises locating the teeth of the gear-like members in an intermeshing relationship.

32. The method of forming a torque transmitting element according to claim 25, wherein the step of forming a torque transmitting member comprises forming a tubular shaft.

33. The method of forming a torque transmitting element according to claim 32, wherein the positioning step comprises positioning the reference member within the torque transmitting member.

34. The method of forming a torque transmitting element according to claim 25, wherein each of the forming steps comprises forming each of the members of substantially identical composite material.

35. A method of sensing relative movement between spaced portions of a shaft having an internally disposed reference member, said method comprising:
 (a) disposing a sensor externally adjacent the shaft and the member;
 (b) providing inside the shaft sensible formations for movement with the shaft and member; and
 (c) using the sensor to detect relative movement between adjacently positioned portions of the shaft and of the member by detecting movement of the sensible formations through the material of the shaft.

36. The method of sensing according to claim 35, and further comprising utilizing, for the shaft and member, materials permeable to the medium utilized by the sensor.

37. The method of sensing according to claim 36, said utilizing further comprising utilizing a composite material having the sensible formations adjacent the sensor.

38. The method of sensing according to claim 37, further comprising forming the sensible formations of a ferromagnetic material.

* * * * *